United States Patent
Zettel

(10) Patent No.: US 7,025,797 B2
(45) Date of Patent: Apr. 11, 2006

(54) FOLDED MESH FILTER FOR PARTICULATES

(75) Inventor: Steven A. Zettel, Cranston, RI (US)

(73) Assignee: ACS Industries, Inc., Woonsocket, RI (US)

( * ) Notice: Subject to any disclaimer, the term of this patent is extended or adjusted under 35 U.S.C. 154(b) by 264 days.

(21) Appl. No.: 10/620,986

(22) Filed: Jul. 16, 2003

(65) Prior Publication Data

US 2004/0055262 A1   Mar. 25, 2004

Related U.S. Application Data

(60) Provisional application No. 60/411,918, filed on Sep. 19, 2002.

(51) Int. Cl.
*B01D 39/20* (2006.01)
*B01D 46/00* (2006.01)

(52) U.S. Cl. ............... 55/282.3; 55/385.3; 55/482; 55/484; 55/520; 55/525; 55/529; 55/DIG. 5; 55/DIG. 10; 55/DIG. 30; 55/DIG. 43; 60/311

(58) Field of Classification Search ........... 55/282.2, 55/282.3, 385.3, 482, 484, 486, 487, 520, 55/525, 527, 528, 529, DIG. 5, DIG. 10, 55/DIG. 30, DIG. 43; 60/311
See application file for complete search history.

(56) References Cited

U.S. PATENT DOCUMENTS

| 2,190,683 | A | * | 2/1940 | Schaaf et al. ............. 55/520 |
| 2,190,886 | A | * | 2/1940 | Schaaf et al. ............. 55/520 |
| 3,964,902 | A | * | 6/1976 | Fletcher et al. ............ 428/608 |
| 4,363,737 | A | | 12/1982 | Rodriguez |
| 4,470,834 | A | * | 9/1984 | Fasanaro et al. .......... 55/501 |
| 5,298,046 | A | | 3/1994 | Peisert |
| 5,352,046 | A | | 10/1994 | Ward |
| 5,405,422 | A | * | 4/1995 | Ueda et al. ............. 55/282.3 |
| 5,716,147 | A | | 2/1998 | Cook et al. |
| RE35,860 | E | | 7/1998 | Ward |
| 6,062,735 | A | | 5/2000 | Ward |
| 6,284,201 | B1 | * | 9/2001 | Buck .................. 55/DIG. 30 |
| 6,318,898 | B1 | | 11/2001 | Ward et al. |

FOREIGN PATENT DOCUMENTS

FR    1 089 987 A    3/1955
JP    2003028174     1/2003

OTHER PUBLICATIONS

Qiu et al., "Preparation of Ni Nanoparticles and Evaluation of Their Tribological Performance as Potential Additives in Oils," *Journal of Tribology*, 123:441-443. (Jul. 2001).

(Continued)

*Primary Examiner*—Duane Smith
*Assistant Examiner*—Jason M. Greene
(74) *Attorney, Agent, or Firm*—Bradley N. Ruben

(57) ABSTRACT

A wire mesh filter is made from a knitted wire sock, folded along its length, and then wound into a spiral, and is useful for diesel traps and other particulate filters that are regenerable by heating the filter.

7 Claims, 1 Drawing Sheet

OTHER PUBLICATIONS

Chinas-Castillo et al., "The Behavior of Colloidal Solid Particles in Elastohydrodynamic Contacts ©," *Tribology Transactions*, 43:387-394 (2000).

Abstract of Hanada et al. "Characterization of diamond nanoclusters and applications to self-lubricating composites," *New Diamond and Frontier Carbon Technology*, pp. 133-142.

Chinas-Castillo et al. "Mechanism of Action of Colloidal Solid Dispersions," Transactions of the ASME, 125:552-557 (2003).

* cited by examiner

FOLDED MESH FILTER FOR PARTICULATES

CROSS REFERENCE TO RELATED APPLICATIONS

This Application claims priority to application No. 60/411,918, filed Sep. 19, 2002.

BACKGROUND

1. Field of the Invention

This invention relates to a wire mesh filter configuration and its use in particulate filters, especially for soot-generating combustion engines, and to a method for making such filters.

2. State of the Art

Diesel engines are particularly well-adapted for heavy work because of their durable design. However, the burning, or internal combustion, of diesel fuel generates a significant amount of particulate matter, such as soot, and much more so than gasoline engines generate.

Recent apparatus for treating diesel exhaust include a metal or ceramic filter in the exhaust stream to trap the particulate matter, often called a "diesel trap." Sensors determine the amount of particulate trapped in or on the filter by changes in the resistance or conductivity of the filter, which changes as soot accumulates on the filter element. At a predetermined fouling of the filter (as determined by the electrical resistance or conductivity), the filter is regenerated by heating the filter. Heating is typically accomplished, especially with a metal filter, by running a current through the filter to generate heat by resistance; ceramic and cermet filters can be heated by having a resistance heating element in contact with the filter.

Kawamura (U.S. Pat. No. 5,651,248, U.S. Pat. No. 5,651,250, and U.S. Pat. No. 5,809,777) discloses a particulate filter made from a combination of a sheet filter, formed by sintering a slurry of ceramic fibers, and a wire mesh heater. The sheet filter can be in the form of a tube having pleats running along the length of the tube with wire heaters disposed within the pleates on the outer surface.

Ban et al. (U.S. Pat. No. 6,024,927) describes a cermet filter having an integral heating element. The filter can be in a cylindrical geometry, and one filter can be nested within another.

Bolt (U.S. Pat. No. 5,557,923) discloses a mesh filter for particulate exhausts in the shape of a cylinder, truncated cone, and/or cone, the filter being regenerable.

Buck (U.S. Pat. No. 5,571,298) discloses a regenerable filter made from mineral fibers and metal wires.

Peter et al. (U.S. Pat. No. 6,063,150) discloses a self-cleaning and self-healing particulate filter in the form of a wire mesh filter sandwiched between sintered metal heating elements.

One of the issues not addressed by the prior art is that when a wire mesh is wound into a cylindrical form, the exhaust gas pressure can cause the mesh to extend ("telescope") out of the spiral/cylindrical form. The use of flanges and other guards to keep the mesh from telescoping can restrict the gas flow more than desired. Especially when the intent of the industry is to use a low density mesh, providing decreased resistance to flow and hence better mileage, an increase in exhaust flow resistance is counterproductive. Accordingly, there is a need for a low density mesh design that can be wound and will not telescope.

SUMMARY OF THE INVENTION

In light of the foregoing, the present invention provides a non-telescoping wire mesh filter.

Such a filter can be made by providing a section of knitted wire mesh having a width and a length, the mesh then being folded along the width to effective half the width while maintaining the length, and then rolling the folded mesh.

Structurally, such a filter can be described as a knitted wire mesh that has been folded and rolled. More particularly, the filter can be described as a knitted wire mesh having a longer dimension and a shorter dimension, folded along the longer dimension so that the shorter dimension is effectively halved, and rolled into a spiral geometry, optionally with a central opening.

DESCRIPTION OF SPECIFIC EMBODIMENTS

One of the objectives of this invention is to provide a low density mesh filter that can be rolled up and disposed in a cylindrical conduit, and that will not telescope within the conduit due to mechanical forces or gas pressure.

The wire used to make the mesh can be of various compositions, and preferably is selected from stainless steels, including austenitic and nickel alloys, such as, but not limited to, 304, 309, and 310 grades of stainless steel. Because the instant device can be regenerated, a high temperature resistant and workable metal, such as an Inconel alloy, is preferred. The composition of the wire is chosen to be chemically compatible (to the extent possible) with the environment in which the filter is disposed and with the fluid (or mixed phases) being filtered.

The wire geometry is preferably round because such a geometry provides the greatest strength; although oval and flat wires have a greater surface area, they have a lower strength. The wire can be knitted using an apparatus such as disclosed in the U.S. Pat. Nos. 2,445,231 and 2,425,293 to McDermott (the disclosures of which are incorporated herein by reference) for producing tubular knitted-wire sock.

The mesh is knit preferably to have a density of less than about 60% of solid density, more preferably less than about 55% or 50% of solid density, and most preferably about 25% solid density, down to about 15% density (although the strength of such a very dense structure may not be sufficient for certain diesel trap applications).

Figure 1:
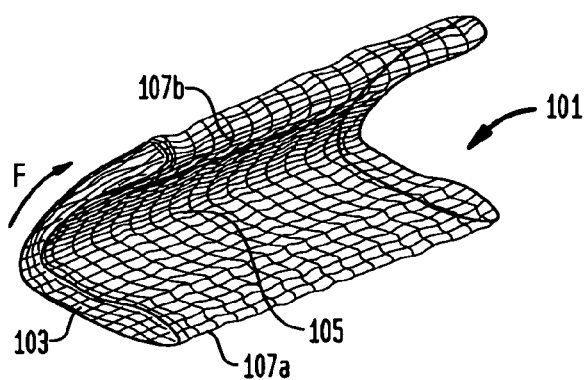
FIG. 1 depicts an idealized perspective view of a piece of mesh being folded.

The knitted mesh emerges from the knitter in the geometry of a sock 101, as shown in FIG. 1, with a central opening 103 (which opening is a vestige of the knitting machine and is not important to the present utility). A length of the knitted mesh sock is folded creating a fold 105 by folding along the longer dimension in the direction of arrow F to create opposing edges 107 in the longer dimension so that the shorter dimension is effectively halved. Folding can be accomplished manually, or by running a fixed length or an indefinite length of the sock through a static mold to create the fold.

Figure 2:
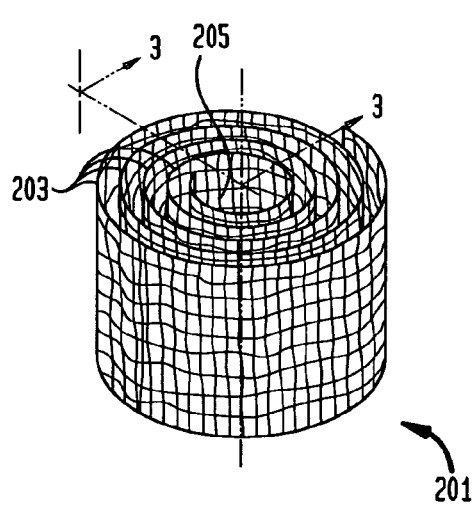
FIG. 2 is an idealized perspective view of folded mesh rolled into a spiral.
Figure 3:
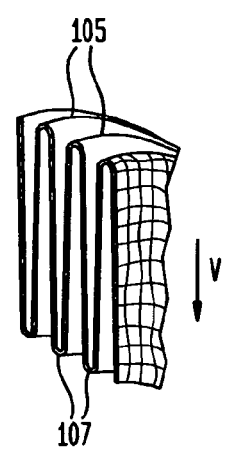
FIG. 3 is an idealized cross-section view along line 3—3 in FIG. 2.

A length of the folded mesh is then rolled or coiled into a spiral shape 201 as shown in FIG. 2. The spiral is shown with the adjacent layers 203 farther apart than would actually occur, for purposes of illustration. In practice, the spiral would be wound tightly, with adjacent layers physically abutting. Optionally, the spiral can be formed with a central opening 205 along the centerline of the spiral. Generally, the central opening will be about 10% to 20% of the total diameter of the spiral. The partial cross-section depicted in FIG. 3 shows the fold and the edges.

The spiral mesh filter apparatus can be used in any filtration apparatus where a wire mesh filter could be used. Preferably, as in the patents noted in the Background section, such a filter would be disposed in a conduit with fluid (e.g., exhaust gas) to be filtered flowing into the center (where the opening 203 could be) and then radially outward through the mesh. In an alternate embodiment without a central opening, the fluid would flow along the axis of the spiral. The folded geometry prevents the spiral from telescoping because of the frictional interactions between the folded sides (each "side" being from the edge 107 to the fold 105) and between the layers. It is preferred that the fold 105 face the direction of fluid flow V.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A wire mesh engine exhaust particulate filter, comprising: a knitted wire mesh sock having a longer dimension and a shorter dimension, folded along the longer dimension so that the shorter dimension is effectively halved, and tightly rolled into a spiral geometry while maintaining a relatively low density, the mesh made from a high temperature resistant alloy.

2. The filter of claim 1, wherein the wire is comprised of type 304, type 309, or type 310 stainless steel.

3. The filter of claim 1, wherein the spiral has no central opening.

4. The filter of claim 1, wherein the spiral has a central opening.

5. The filter of claim 1, wherein the wire is electrically conductive.

6. A regenerable particulate trap for an engine exhaust having a wire mesh filter, the filter being regenerated by resistive heating, wherein the improvement comprises a wire mesh filter, comprising: a knitted wire mesh sock having a longer dimension and a shorter dimension, folded along the longer dimension so that the shorter dimension is effectively halved, and tightly rolled into a spiral geometry while maintaining a relatively low density, the mesh made from a high temperature resistant alloy.

7. The particulate trap of claim 6, wherein the trap is positioned in the exhaust so that the fold is the leading edge in the exhaust stream.

* * * * *